Feb. 13, 1968 T. L. GATTA 3,368,384
THERMOELECTRIC DEVICE FOR IDENTIFYING HEAT TREATABLE STEELS
Filed March 15, 1965 2 Sheets-Sheet 1

INVENTOR.
THEODORE L. GATTA
BY
Hopgood & Calimafde
ATTORNEYS.

INVENTOR.
THEODORE L. GATTA
BY Hopgood & Calimafde
ATTORNEYS.

United States Patent Office 3,368,384 Patented Feb. 13, 1968

3,368,384

THERMOELECTRIC DEVICE FOR IDENTIFYING HEAT TREATABLE STEELS

Theodore L. Gatta, New Britain, Conn., assignor to The Fafnir Bearing Company, New Britain, Conn., a corporation of Connecticut Filed Mar. 15, 1965, Ser. No. 439,783
4 Claims. (Cl. 73—15)

ABSTRACT OF THE DISCLOSURE

A thermoelectric device is provided for identifying metal compositions in accordance with their metallurgical characteristics. The device comprises a metal probe of composition which produces a thermoelectric effect when placed in contact with a metal of different composition. The probe has associated with it heating means for heating it to a predetermined temperature, such that when the probe is brought in contact with the metal specimen, a thermal E.M.F. is generated which is measured or recorded by an instrument.

This invention relates to a thermoelectric method and device for identifying metals of varying compositions, and to a micro-thermal device for determining and monitoring the metallurgical characteristics of certain metal compositions, such as heat treatable steels and the like. The device may also have utility in monitoring the production of such metal shapes as wire leads, foil, and the like, where uniformity of composition is desirable.

It is known to use the thermoelectric characteristics of unlike metals as a non-destructive means for separating or segregating metals of like characteristics (or composition) from one or more other metals. A probe of a particular composition in the heated condition, for example heated to a temperature of approximately 150° F., is employed to contact the particular metal being tested, the contact point being referred to as the hot junction. Two junctions are employed, each formed by contacting or joining the same two unlike metals, one junction being the hot junction mentioned hereinabove, the other being held at the temperature of its surroundings and being referred to as the cold junction. A greater thermal voltage is generated at the hot junction than at the cold junction and the resulting voltage is the voltage generated at the hot junction less the voltage generated at the cold junction. The purpose of the second or cold junction is to compensate for any variation in the ambient temperature such that, as the ambient temperature rises, both junctions are affected in the same manner so that the difference between the two voltages, for all practical purposes, will be constant.

A disadvantage of the foregoing method is that by using a cold junction, the resultant thermal E.M.F. generated, as will be pointed out hereinafter, is generally small such that, as between certain steel compositions, sufficient overlapping occurs which tends to interfere with the test.

I have now found that I can increase the efficiency of testing by utilizing an improved micro-thermal device that enables separation of compositions which heretofore presented difficulties with prior devices.

It is thus an object of my invention to provide an improved thermoelectric method for identifying metal compositions.

Another object is to provide an improved microthermal device for identifying and segregating metals of various compositions or metallurgical characteristics.

These and other objects will more clearly appear when taken in conjunction with the following disclosure and the appended drawings, wherein.

Figure 1:
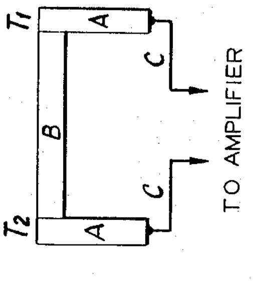
FIGS. 1 and 2 are illustrative of two thermoelectric circuits.

The thermoelectric circuit shown in FIG. 1 is illustrative of the prior art circuit previously discussed. Here the metal being tested is designated by the letter B. Two junctions are shown: a hot junction $T_2$ arising from the contact of alumel probe A at an elevated temperature $T_2$ with metal B on the one hand, and a cold junction $T_1$ arising, on the other hand, from the contact of alumel probe A with metal B at an ambient temperature $T_1$ remote from the hot junction. The current generated is conducted by copper wires C to an amplifier not shown. As was stated hereinbefore, this circuit has several difficulties inherent in the thermoelectric principles used. For one thing, the use of the cold junction results in a low E.M.F. due to the fact that a bucking voltage is generated at the cold junction which results in a less overal voltage at the terminals.

Another effect of the arrangement shown in FIG. 1 is the setting up of an $I^2R$ heating effect due to the resistance of the wires as current is drawn from the thermoelectric circuit. The current generated in addition creates a Peltier heating effect which also decreases the overall voltage in the circuit.

Figure 2:
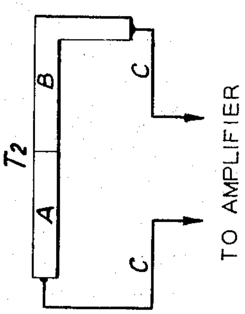

I have found that by removing the cold junction and taking advantage of the absolute E.M.F.-temperature relationship by working at higher probe temperatures (note the thermoelectric circuit of FIG. 2), I am able to obtain a greater divergence in E.M.F.'s between the steels tested than heretofore. In addition, I find that I obtain a widening of the distribution of the E.M.F.'s. In order to insure consistent results at the higher test temperatures, and to overcome any possible effect of any variation in ambient temperature, I provide a temperature control circuit which controls the temperature of the probe accurately. In addition, it may be desirable to insure that the samples being separated are at a uniform and determined temperature. Some type of environmental conditioning (e.g. air, water, bath, etc.) may be necessary for uniform results.

Thus, stating it broadly, the method aspect of my invention comprises heating a metal probe having a composition which produces a measurable thermoelectric effect when the probe is placed in contact with a metal specimen at a predetermined hot junction temperature, producing an electric signal corresponding to the temperature at the hot junction, controlling the heat input to the metal probe in accordance with the electric signal to maintain the predetermined junction temperature constant, measuring the thermal E.M.F. generated at the hot junction, and correlating the thermal E.M.F. to the metallurgical characteristics of the metal specimen.

The micro-thermal E.M.F. device for carrying out the method comprises, a metal probe of composition which produces a thermoelectric effect when placed in contact with a metal specimen of different composition to be tested, means for heating the probe, temperature indicating means associated with said probe and adapted via circuit means for controlling the heating means, means for bringing the probe in contact with the metal specimen, and circuit means associated with the probe for expressing the thermal E.M.F. generated when the heated probe is in contact with the metal specimen.

Figure 3:
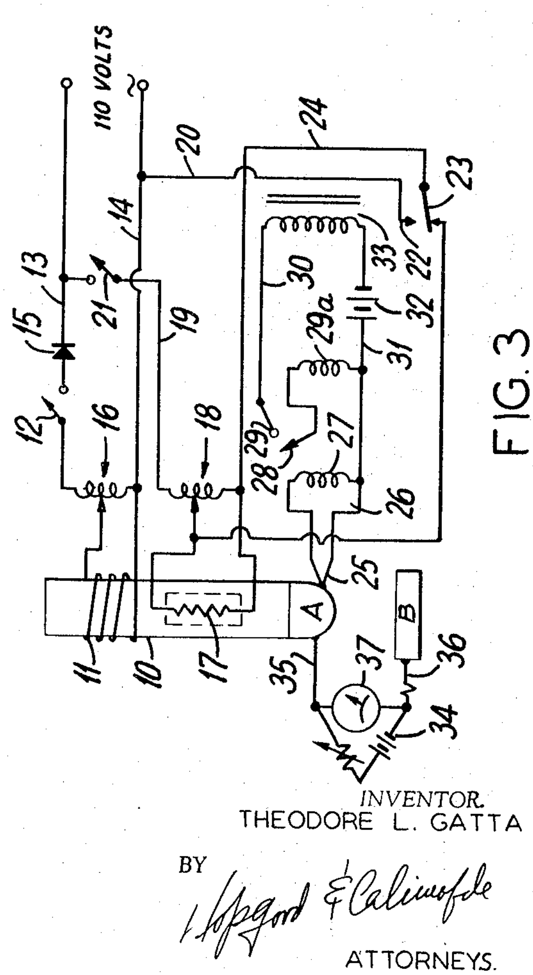
FIG. 3 shows one embodiment of the invention for testing a metal specimen.

Referring now to FIG. 3, I show diagrammatically one embodiment of my device provided by the invention. A steel shank 10 is depicted adapted as a solenoid via coil 11 to move downward when switch 12 in line 13 is closed. Alternating current (110 volts) is drawn through supply lines 13, 14 and rectified by rectifier 15, a variable D.C. voltage being produced by means of potentiometer 16.

The shank has built within it an electric resistant heating element 17 which draws variable A.C. voltage by means of potentiometer 18 from lines 19 and 20 coupled to supply lines 13 and 14, respectively. A switch 21 is provided in line 19 for closing the circuit. Line 20 has a terminal 22 which relay-actuated switch 23 contacts for completing the circuit via line 24 to electrical heat resistant element 17.

At the bottom end of the shank, a thermoelectric sensitive probe A is provided having in contact therewith a thermocouple 25 with its associated circuit 26 having a coil 27 for actuating a meter-relay circuit comprising meter contact 28 and 29 with associated coil 29*a*, lines 30 and 31, a mercury battery 32 and relay 33. Probe A is electrically connected via line 35 to a Wheatstone bridge or balancing potentiometer 34 which is series connected by means of line 36 to a metal specimen B.

The device is operated by first closing heating switch 21. Since the temperature is below the desired testing temperature, relay actuated switch 23 makes contact with terminal 22. Circuit switch 12 is then closed whereby steel shank 10 moves downward and probe A makes contact with metal specimen B. A reading is obtained on meter 37 which is thereafter compared to a previously prepared chart to determine the composition or metallurgical characteristics of metal B. Thermocouple 25 is meanwhile continuously indicating the temperature at the tip of the probe and controlling the heat input circuit via relay-actuated switch 23.

Figure 4:
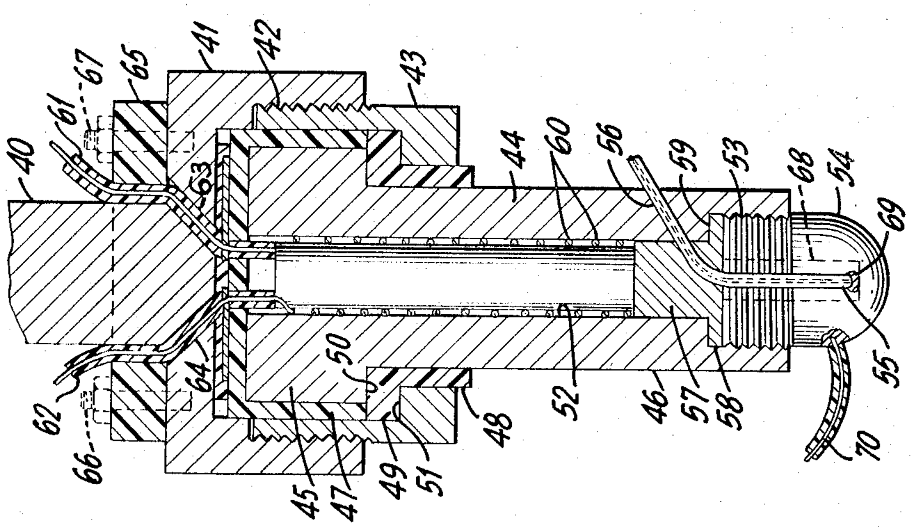
FIG. 4 PRIOR ART
FIG. 4 is illustrative of one embodiment of a thermoelectric receptor for carrying out the invention.

The portion of the thermoelectric receptor employed in carrying out the invention is shown in more detail in the cross section of FIG. 4, the receptor comprising a cylindrical steel shank portion 40 having integrally depending from it a hollow steel cap 41 of enlarged diameter internally threaded at 42 and having in threaded engagement therewith annular steel collar 43, the cap and collar serving to support furnace probe mount 44 having an enlarged end portion 45 and a reduced forwardly extending portion 46. The furnace probe mount is insulated from the steel cap and collar by means of a heat jacket formed of polytetrafluoroethylene plastic or other suitable insulator. The heat jacket is shown made of two parts comprising cup-shaped part 47 which fits over and conforms to the shape of enlarged end portion 45 of the probe mount. The other part 48 has an annular configuration and has a flanged end 49 which rests against shoulder 50 of enlarged end 45 on one side and shoulder 51 of collar 43 on the other side. As will be apparent, cap 41 and collar 43 cooperate via heat jackets 47 and 48 in axially supporting probe mount 44.

The probe mount has a chamber 52 therein running axially to near the top thereof, the chamber opening at the bottom into a threaded portion 53 of enlarged diameter in which is threaded a probe element 54 of, for example, a metal composition referred to in the trade as "Berylco" (an alloy comprising about 0.4 to 0.7% Be, 2.35 to 2.70% Co or Ni and the balance Cu), it being understood that the probe element may be of any alloy material capable of producing a thermoelectric effect when in contact with a metal of different composition. The probe has associated with it a thermocouple 55 shown entering the probe through probe mount 44 via an opening 56 which is coextensive with an opening in a flanged bronze plug 57 which fits snugly in chamber 52, with the flange 58 of the plug bearing against internal shoulder 59 of the mount. The probe is fastened tight against the flange of the plug in order to insure efficient conduction of heat to it from a heater comprising an electrical resistant heating element 60 wound around a ceramic tube.

The heating element is connected via terminals as shown to a pair of lead wires 61, 62 (suitably insulated by, for example, polytetrafluoroethylene) which pass through a pair of openings in heat jacket 47 through a pair of divergent channels 63, 64 in cap 41, through openings in a mounting of insulation 65, such as polytetrafluoroethylene, the mounting being fastened to the top of cap 41 via screws 66 and 67. The lead wires 61, 62 are coupled to a heating circuit, such as shown in the circuit layout of FIG. 3. The thermocouple 56 is soldered to the bottom of cavity 68 at 69 and is connected to a control circuit of the type shown in FIG. 3. A lead wire 70 extends from probe 54 (FIG. 4) and is series connected via a balancing bridge to the metal specimen to be tested as shown in FIG. 3. The wires 61, 62, thermocouple 56 and lead wire 70 are adapted to withstand the operating temperature of the device. It is important that thermocouple 56 does not undergo any metallographic changes at the operating temperatures.

I have found that with my device, I am able to obtain a sufficient degree of sensitivity whereby M–50 steel can be distinctly separated from 440C and 52100, at relatively low probe temperatures within the range of 200° F. to 300° F. and the complete separation of all three steels from each other at the higher probe temperature of 550° F. Chemical composition and structure as well as temperature drops were seen to effect thermal E.M.F. values and data obtained on retained austenite, hardness and heat treatment clearly indicate the possibility of making analysis and prediction of such properties using the thermal E.M.F. method.

Three series of steels were tested using the procedure of the invention, the steels having the following nominal composition:

| Steel designation: | Composition |
|---|---|
| M–50 | 0.8% C, 0.3% Mn, 0.3% Si, 4% Cr, 4.25% Mo, 1% V, balance Fe. |
| 440C | 0.9–1.2% C, 16–18% Cr, 0.75% max. Mo, balance Fe. |
| 52100 | 0.95–1.1% C, 1.3–1.6% Cr, 0.25–0.45% Mn, 0.2 to 0.35% Si, 0.025% max. P, 0.025% max. S, balance Fe. |

The steels were austenitized at various temperatures, oil quenched, in some instances refrigerated and then tempered.

With respect to steel 440C, the specimens were austenitized at temperatures ranging from 1850° F. to 2000° F., some of them refrigerated and subsequently tempered at temperatures from 200° to 300° F.

With respect to steel M–50, the specimens were austenitized at temperatures ranging from 1940° to 2060° F. followed subsequently by triple tempering at temperatures ranging from 940° to 1060° F.

The 52100 steels were austenitized in the usual manner, some of them refrigerated and then tempered over the range of 250° to 550° F.

In the comparison of some of the steels at a probe temperature of 200° F., the M–50 steel exhibited thermoelectric effect of about 1.5 to 1.6 mv., the 440C steel an effect of about 1.3 to 1.38 mv., and the 52100 steel an effect of about 1.2 to 1.36 mv. Likewise at 250° F., the M–50 steel exhibited an effect of about 1.68 to 1.78 mv., the 440C steel an effect of about 1.32 to 1.42 mv., and the 52100 steel an effect of about 1.2 to 1.4 mv. At 300° F., M–50 showed an effect of about 1.74 to 1.93 mv., 440C an effect of about 1.38 to 1.58 mv., and the 52100 steel an effect of about 1.2 to 1.46 mv. As will be noted, the M–50 steel is obviously separable from the other two steels. However, when using the prior device involving the system of FIG. 1, actual production runs of M–50 steel bearing balls were rejected because of overlap with the 52100 bearing balls.

It will be further noted from the foregoing that as the probe temperature increases, some separability between the 440C and the 52100 steels is indicated. This becomes even more pronounced at a probe temperature of about 550° F. at which the following thermoelectric effects were indicated:

| Steel: | Millivolt reading |
|---|---|
| M–50 | 2.0 to 2.42 |
| 440C | 1.55 to 1.95 |
| 52100 | 1.15 to 1.50 |

As is evident, a complete separation of the three steels is possible. Thus, by using a low probe temperature, the M–50 steel can be separated from both the 440C and the 52100 series, while raising the probe temperature enables the separation of the two latter steels. By using a temperature stabilization circuit of the type shown in FIG. 3, it is possible to work over a broader range of controlled probe temperatures than heretofore used, depending upon the metal being tested. With the improved device, the probe temperature may be employed at room temperature and may range from 100° F. to as high as about 600 or 700° F. and above, so long as proper design precautions are taken.

The problem of temperature range is entirely dependent on the nature of the separating or segregating being done. Metals with divergent thermoelectric properties may be separated at room temperature using an insensitive reading arrangement. On the other hand, when studying samples with only small differences in composition, it was found that higher temperatures yielded better separation. The maximum limit is thus only dependent on the construction of the device and it may be found desirable to use the device at temperatures exceeding 600° F. It might be noted that the receptor unit should be heat treated with reference to the temperature range in which the unit is expected to operate; this especially includes the individual probes which must, of course, be heat stabilized. In other words, the receptor or probe shall not undergo any metallographic change at the temperature.

Figure 6:
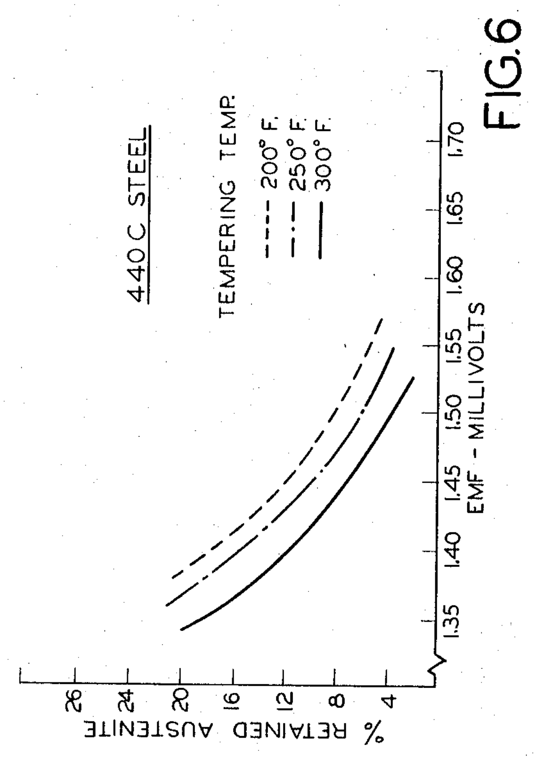
FIGS. 5 to 8 are curves comparing the thermoelectric characteristics of alloy steels referred to in the trade as 440C and 52100.
Figure 5:
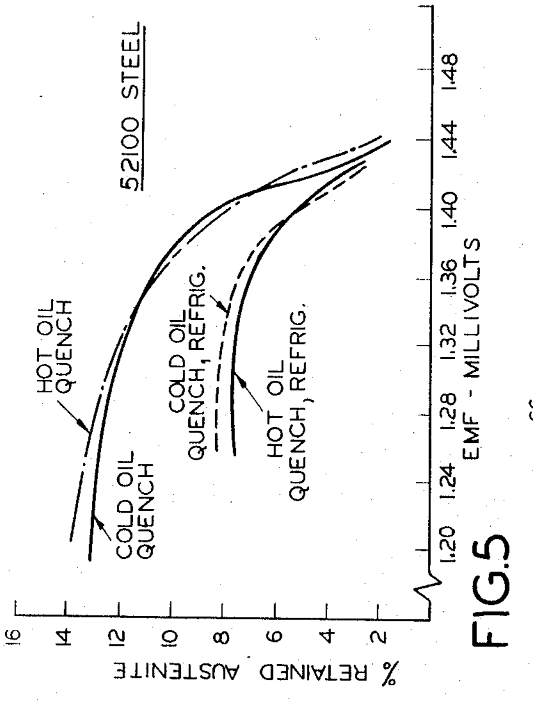

With regard to the 440C and the 52100 and other steels, tests have indicated that chemical-structural or metallographic properties appear to relate to the E.M.F. generated at the hot junction. The 440C and 52100 steels in particular showed an inverse relationship between the amount of retained austenite and the E.M.F. generated at the hot junction. In FIG. 5, a plot is given relating retained austenite resulting from varying the austenitizing quench treatment and tempering at 385° F. to the thermal E.M.F. obtained using a probe at 300° F. In FIG. 6, a similar plot is shown for 440C steel correlating retained austenite to the E.M.F. at varying tempering temperatures. As will be evident, the separation of the two steels seems feasible at a probe temperature of 300° F. by stipulating certain heat treatments. Thus, in the case of the 52100 steel, it appears that at a retained austenite of above 3%, corresponding to a temper at 385° F. or below, a maximum thermal E.M.F. is indicated at about 1.41 mv., while 440C steel with a retained austenite of below 8% exhibits a minimum thermal E.M.F. of 1.43 mv.

Figure 8:
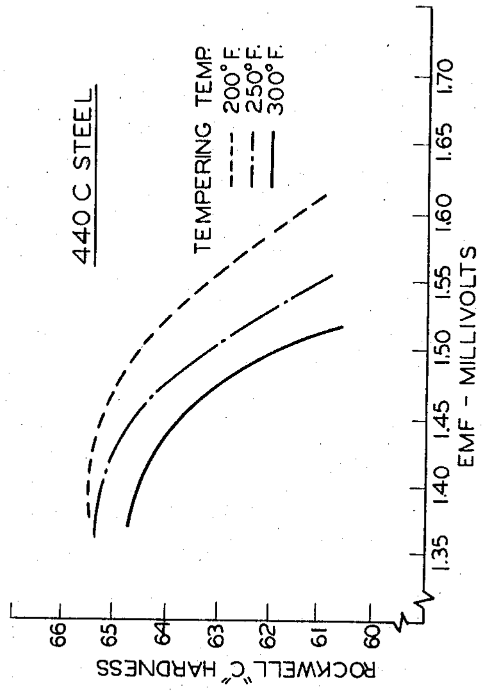
Figure 7:
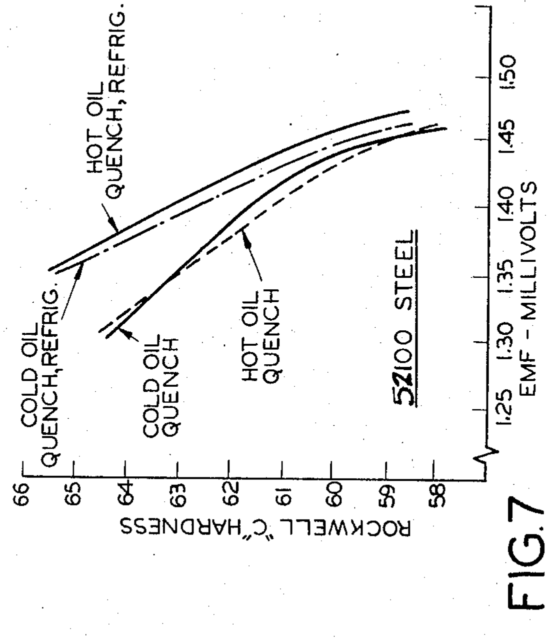

Rockwell "C" data for both the 52100 and 440C steels are plotted in FIGS. 7 and 8, respectively, the plot showing an inverse relationship to the thermal E.M.F.

As will clearly appear from the correlated data of FIGS. 5 to 8, a production-oriented, non-destructive testing of various steels is possible with particular interest in such properties as hardness, heat treatment and retained austenite. While the metals tested relate to steels of various compositions, it will be appreciated that the invention is applicable to the testing of other metals including non-ferrous alloys, especially those capable of undergoing phase transformation by heat treatment, including age hardenable alloys. However, depending on the sample being tested, it may be necessary to take the readings in a short enough time so that the sample does not undergo heat treatment during the test.

Examples of other probe materials which may be used in place of "Berylco" are "Alumel" (an alloy comprising 2.5% Mn, 2% Al, 1% Si and the balance Ni), stainless steel such as 440C, copper, aluminum, and other metals and alloys, provided the materials employed are metallographically stable at the particular test temperature employed. I have found "Berylco" and "Alumel" particularly adapted for my purposes.

While the probe is shown as having a blunt nose, it will be understood that it can take a variety of shapes. For example, the probe could be needle shaped. Such a probe would have particular utility when employed with the temperature stabilization circuit shown in FIG. 3, in that it would enable the study of phase transformation within the grains and at grain boundaries.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A micro-thermal E.M.F. device for determining the metallurgical characteristics of metal compositions which comprises, a single metal probe of a composition which produces a thermoelectric effect when placed in contact with a metal specimen of different composition to be tested, electrical means for heating said probe to a predetermined temperature, temperature indicating means coupled to said probe and adapted via an electrical circuit for controlling said heating means, means coupled to said device for bringing said probe in contact with a metal specimen to be tested, a balancing circuit series connected to said probe for expressing the thermal E.M.F. generated when the heated probe is in contact with said metal specimen and a line directly coupling said balancing circuit in series with said metal specimen.

2. A micro-thermal E.M.F. device for determining the metallurgical characteristics of metal compositions which comprises, a metal probe of a composition which produces a thermoelectric effect when placed in contact with a metal specimen of different composition to be tested, electrical means for heating said probe, a thermocouple associated with said probe and adapted via a relay circuit for controlling said probe heating means, a solenoid and associated circuit for bringing said probe in contact with a metal specimen to be tested, a balancing circuit series connected to said probe for expressing the thermal E.M.F. generated when the heated probe is in contact with said metal specimen, and means for coupling said balancing circuit in series with said metal specimen.

3. A micro-thermal device for determining the metallurgical characteristics of metal compositions which comprises, a thermoelectric receptor comprising a metal shank having a single metal probe at one end of a composition which produces a thermoelectric effect when placed in contact with a metal specimen of different composition to be tested, means coupled to said metal shank for moving the probe end to an operable position, an electric resistance heating means associated with said receptor for heating the probe thereof, temperature indicating means associated with said probe and adapted via an electric circuit for controlling the electric resistance heating means, a circuit associated with said probe for expressing the thermal E.M.F. generated when the probe is in contact with a metal specimen, and a line directly coupling said circuit of said probe in series with said specimen.

4. A micro-thermal device for determining the metallurgical characteristics of metal compositions which comprises, a thermoelectric receptor comprising a metal shank having a metal probe at one end of a composition which produces a thermoelectric effect when placed in contact with a metal specimen of different composition to be tested, a solenoid associated with said metal shank for moving the probe end to an operable position, said solenoid being coupled to an actuating electric circuit, an electric resistance element associated with said receptor for heating the probe thereof including an electric circuit coupled thereto, a thermocouple in contact with said probe and adapted via circuit means for controlling the electric resistance element, and a balancing circuit series connected to said probe for expressing the thermal E.M.F. generated while the probe is in contact with said metal specimen, said balancing circuit being series connectable to said metal specimen.

References Cited

UNITED STATES PATENTS

| | | | |
|---|---|---|---|
| 2,878,669 | 3/1959 | Knudson et al. | 73—15 |
| 2,924,771 | 2/1960 | Greenberg et al. | 324—32 |
| 3,093,791 | 6/1963 | Richards | 324—32 |

JAMES J. GILL, *Primary Examiner.*

RICHARD C. QUEISSER, *Examiner.*

J. C. GOLDSTEIN, E. SCOTT, *Assistant Examiners.*